United States Patent [19]

Wormsbecher et al.

[11] Patent Number: 5,525,210
[45] Date of Patent: Jun. 11, 1996

[54] SULFUR REDUCTION IN FCC GASOLINE

[75] Inventors: Richard F. Wormsbecher, Highland; Gwan Kim, Olney, both of Md.

[73] Assignee: W. R. Grace & Co. Conn., New York, N.Y.

[21] Appl. No.: 297,738

[22] Filed: Aug. 30, 1994

Related U.S. Application Data

[63] Continuation of Ser. No. 10,035, Jan. 27, 1993, Pat. No. 5,376,608.

[51] Int. Cl.$^6$ .................................................. C10G 11/05
[52] U.S. Cl. ........................... 208/122; 208/121; 208/123; 208/124
[58] Field of Search .............................. 208/121, 122, 208/123, 124

[56] References Cited

U.S. PATENT DOCUMENTS

| | | | |
|---|---|---|---|
| 3,808,121 | 4/1974 | Wilson | 208/113 |
| 3,883,442 | 5/1975 | McArthur | 252/432 |
| 4,010,116 | 3/1977 | Secor et al. | 252/455 |
| 4,115,251 | 9/1978 | Flanders et al. | 208/120 |
| 4,259,176 | 3/1981 | Blanton et al. | 208/120 |
| 4,263,020 | 4/1981 | Eberly, Jr. | 55/62 |
| 4,369,130 | 1/1983 | Bertolacini | 252/455 |
| 4,376,103 | 3/1983 | Bertolacini et al. | 423/244 |
| 4,405,443 | 9/1983 | Bertolacini et al. | 208/113 |
| 4,423,019 | 12/1983 | Bertolacini et al. | 423/244 |
| 4,425,312 | 1/1984 | Brignac | 423/230 |
| 4,428,827 | 1/1984 | Hobbs et al. | 208/120 |
| 4,469,589 | 9/1984 | Yoo et al. | 208/120 |
| 4,471,070 | 9/1984 | Siefert et al. | 502/302 |
| 4,472,267 | 9/1994 | Yoo et al. | 208/120 |
| 4,495,304 | 1/1985 | Yoo et al. | 502/66 |
| 4,495,305 | 1/1985 | Yoo et al. | 502/65 |
| 4,497,902 | 2/1985 | Bertolacini et al. | 502/65 |
| 4,592,829 | 6/1986 | Eberly, Jr. | 208/89 |
| 4,609,539 | 9/1986 | Horecky et al. | 423/244 |
| 4,620,053 | 10/1986 | Welch | 585/664 |
| 4,622,210 | 11/1986 | Hirschbert et al. | 422/144 |
| 4,642,177 | 2/1987 | Mester et al. | 208/113 |
| 4,690,806 | 9/1987 | Schorfheide | 423/230 |
| 4,724,226 | 2/1988 | Cheng et al. | 502/204 |
| 4,728,635 | 3/1988 | Bhattacharyya et al. | 502/304 |
| 4,735,705 | 4/1988 | Burk, Jr. et al. | 208/113 |
| 4,755,498 | 7/1988 | Setzer et al. | 502/303 |
| 4,790,982 | 12/1988 | Yoo et al. | 423/239 |
| 4,836,993 | 6/1989 | Bertolacini et al. | 423/244 |
| 4,918,036 | 4/1990 | Rheaume et al. | 502/66 |
| 4,937,058 | 6/1990 | Dupin et al. | 423/224 |
| 5,002,654 | 3/1991 | Chin | 208/121 |
| 5,077,261 | 12/1991 | Schubert | 502/408 |
| 5,110,780 | 5/1992 | Peters | 502/303 |
| 5,146,039 | 9/1992 | Wildt et al. | 585/820 |
| 5,376,608 | 12/1994 | Wormsbecher et al. | 502/61 |

FOREIGN PATENT DOCUMENTS 517621  8/1981  Australia.

*Primary Examiner*—Asok Pal
*Attorney, Agent, or Firm*—Steven Capella

[57] ABSTRACT

Zeolite cracking catalyst compositions and additives that contain a Lewis acid supported on alumina are useful to process hydrocarbon feedstocks. The compositions are especially useful for the production of reduced sulfur gasoline.

11 Claims, 18 Drawing Sheets

SULFUR REDUCTION IN FCC GASOLINE

This is a continuation, of application Ser. No. 010,035, filed Jan. 27, 1993, now U.S. Pat. No. 5,376,608.

BACKGROUND OF THE INVENTION

The present invention relates to catalytic cracking, and more specifically to catalytic cracking compositions and processes that may be used to catalytically convert high molecular weight feedstocks into valuable lower molecular weight products having reduced sulfur content.

It is generally known that catalytic cracking catalysts which comprise zeolites such as synthetic faujasite, zeolite Beta, and ZSM-5 dispersed in an inorganic oxide matrix such as silica/alumina hydrogel, sols and clay may be used to economically convert heavy hydrocarbon feedstocks such as gas-oils and/or resid into gasoline and diesel fuel.

More recently it has been disclosed that the addition of SOx reduction "additives" such as alumina, magnesium aluminate (spinel) to cracking catalyst compositions will improve the overall performance of tile catalyst, particularly when used to process feedstocks that contain significant quantities of sulfur.

Canadian patent 1,117,511 describes FCC catalysts which contain free alumina hydrate, particularly alpha-alumina hydrate (boehmite) which may be used to catalytically crack hydrocarbons that contain sulfur.

U.S. Pat. No. 4,010,116 discloses FCC catalysts which contain pseudo-boehmite aluminas that may contain crystalline trihydrate components such as bayerite and gibbsite.

While it is recognized that additives including aluminas and spinels may be added to catalytic cracking catalysts to reduce SOx emissions during the oxidation and regeneration of FCC catalyst, the industry has not developed catalytic cracking catalyst compositions that reduce the sulfur level of cracked products such as gasoline and diesel fuel

SUMMARY OF THE INVENTION

It is therefore an object to provide improved FCC catalysts and additives which possess the ability to reduce the sulfur content of cracked products.

It is another object of the present invention to provide improved catalytic cracking compositions, additives and processes for converting sulfur-containing hydrocarbon feedstocks to low sulfur gasoline and diesel fuel.

It is yet a further object to provide a particulate FCC catalyst additive composition that may be blended with conventional zeolite-containing catalysts to reduce the sulfur content of cracked products.

These and additional objects of the invention will become readily apparent to one skilled-in-the-art from the following detailed description, specific examples, and drawings.

DETAILED DESCRIPTION OF THE INVENTION

Figure 1:
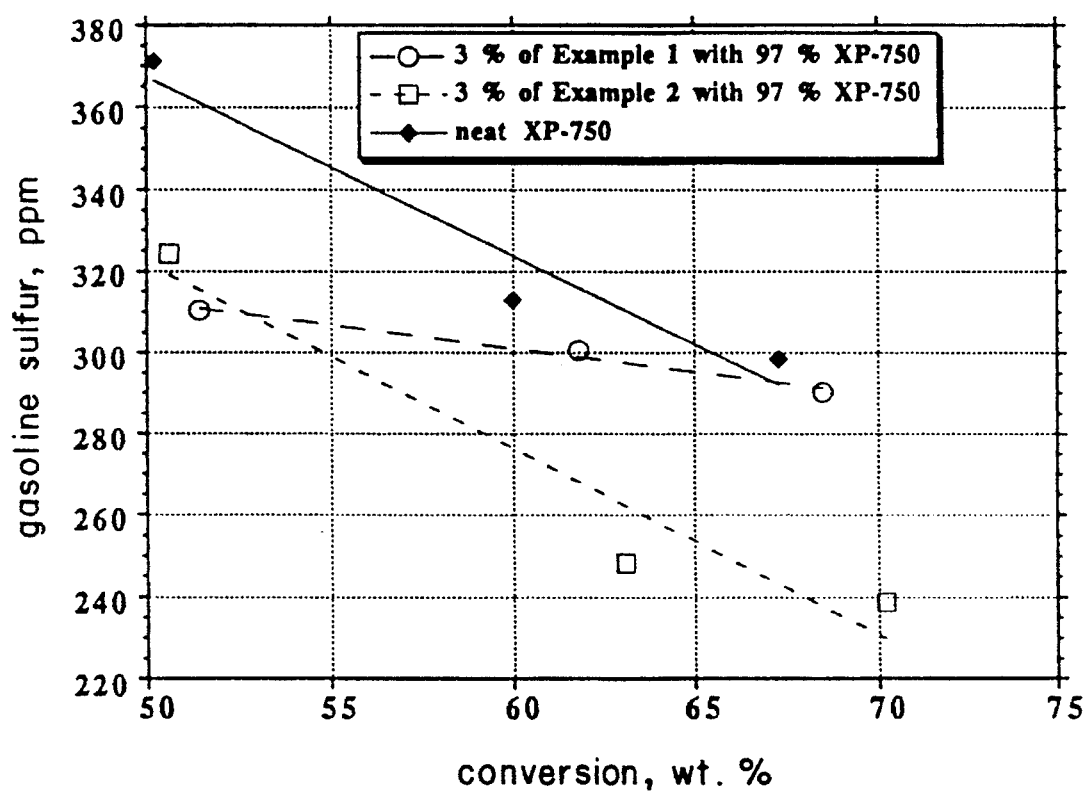
FIGS. 1–18 are graphic representations of Conversion vs. Gasoline sulfur content data, which illustrates the sulfur reduction capability of catalysts/additives of our invention.

Broadly, our invention contemplates zeolite catalytic cracking catalyst compositions and additives that contain a Lewis acid supported upon alumina and the use thereof to process hydrocarbon feedstocks.

More specifically, we have discovered that cracking catalyst compositions which contain from about 1 to 50 weight percent of a Lewis acid such as a compound of Ni, Cu, Zn, Ag, Cd, In, Sn, Hg, Tl, Pb, Vi, B, Al (other than $Al_2O_3$) & Ga supported on alumina may be used to obtain gasoline fractions that have low sulfur content.

In particular, we have found that if a composition which comprises from about 1 to 50 weight percent of a Lewis acid supported on alumina is added to conventional particulate zeolite containing fluid catalytic cracking (FCC) catalysts as either an integral catalyst matrix component or as a separate particulate additive having the same particle size as the conventional FCC catalyst, the catalysts may be used in the catalytic cracking of high molecular weight sulfur containing hydrocarbons feedstocks such as gas-oil, residual oil fractions and mixtures thereof to produce products such as gasoline and diesel fuel that,have significantly reduced sulfur content.

Furthermore, the surface area of the Lewis acid on alumina should be as high as possible to facilitate the interaction of the sulfur species in the hydrocarbon feedstock. In other words, the dispersion of the Lewis acid on the support should be as high as possible. Therefore, compounds which can stabilize the alumina support surface area can be incorporated in the support, such as lanthana, or baria. Silica, which is also known to stabilize the surface area of alumina is detrimental to this invention.

While the mechanism by which the Lewis acid-containing alumina removes the sulfur components normally present in cracked hydrocarbon products is not precisely understood, it is believed that the Lewis Base (basic) sulfur species produced in the cracking of sulfur-containing hydrocarbons, such as gas-oil, interact with the Lewis acid on alumina by adsorption or chemical reaction.

In other words, during the catalytic cracking of a sulfur-containing gas-oil at 500° to 550° C. sulfur species are produced in the gasoline boiling range from the cracking reaction. These species are thiophene, $C_1$ to $C_4$ alkylthiophenes, tetrahydrothiophene, and propyl to hexyl mercaptans, which all have boiling points in the gasoline range. These species are Lewis bases and can interact with the Lewis acid-containing alumina. One such interaction would be adsorption of the sulfur Lewis base species to the Lewis acid-containing alumina in the riser/reactor side of the FCCU. The adsorbed species on the Lewis acid-containing alumina could then be oxidized free of the sulfur Lewis base species in the regenerator side of the FCCU, enabling more sulfur species to be adsorbed in the riser/reactor side. Another interaction would be the adsorption of the sulfur Lewis base on the Lewis acid-containing alumina, followed by cracking reactions in the riser/reactor side of the FCCU. The most likely products from these reactions would be hydrogen sulfide and hydrocarbons free of sulfur.

As shown in the examples, this invention selectively removes those sulfur species from the gasoline, such as thiophene, methylthiophenes, ethylthiophenes, propylthiophenes, and tetrahydrothiophene.

The Lewis acid-containing alumina component is prepared by reacting/impregnating an alumina substrate, which in itself has Lewis acid properties, having a surface area of about 30 to 400 $m^2/g$, with a "second" Lewis acid component selected from the group consisting of elements/compounds selected from the group consisting of Ni, Cu, Zn, Ag, Cd, In, Sn, Hg, Tl, Pb, Bi, B, Al (not $Al_2O_3$), Ga and mixtures thereof.

The preferred "desulfurizing" compositions of our invention contain from about 1 to 50 weight percent and preferably 10 to 40 weight percent of the second Lewis acid component, expressed as the oxide, and the balance alumina ($Al_2O_3$).

Our Lewis acid desulfurization compositions are prepared by impregnating an alumina support having a particle size of 1 to 150 mµ with a salt solution of the second Lewis acid component. Typically, aqueous solutions which contain from about 10 to 20 weight percent of the Lewis acid metal salt compound, preferably the nitrates, chlorides and sulfates are used to impregnate the alumina to incipient wetness, i.e. fill the water pore volume.

The impregnated alumina is then dried at 100° to 150° C. and heated (calcined) at 200° to 850° C. to remove the anionic component, such as chloride, nitrate, or sulfate, thereby yielding a particulate desulfurization composition which may be added to commercial zeolite-containing "cracking" catalyst either as a component of the catalyst particulate, or as a separate particulate additive.

The hydrothermal stability of alumina substrate can be improved by stabilizing alumina with approximately 5 to 30 weight percent $La_2O_3$. This can be achieved either-by incipient-wetness impregnation of alumina particles with an aqueous solution of lanthanum or lanthanum-rich rare earth salt solution, followed by drying and calcination, or by co-precipitating well-mixed hydrous oxides of both lanthanum and aluminum, followed by washing, drying, and calcination.

Dispersion of the key Lewis acid component can be improved by including a precursor of this ingredient in the co-precipitation of well-mixed hydrous oxides of aluminum and lanthanum. For example, a key Lewis acid such as ZnO can be well-dispersed on lanthana-stabilized alumina by a co-precipitation reaction as follows: two feedstreams are simultaneously fed into a mix-pump, one acidic stream containing a mixed aqueous solution of Zn, La (or La/Nd or La-rich rare earth) salts along with an acid as needed, the other a basic solution containing a sodium aluminate solution and sodium hydroxide as needed, maintaining approximately 8 to 9.5 pH at the mix-pump outlet. After dewatering, milling, and homogenization, the resulting slurry is spray dried, washed, dried, and calcined at approximately 500° to 700° C. to obtain attrition resistant particles compatible with FCC catalysts.

Catalysts which may be improved by the addition of our Lewis acid compositions typically comprise crystalline alumino-silicate zeolites such as synthetic faujasite i.e. type Y zeolite, type X zeolite, Zeolite Beta, ZSM-5, as well as heat treated (calcined) and/or rare-earth exchanged derivatives thereof dispersed in an inorganic oxide matrix. Zeolites which are particularly suited include calcined rare-earth exchanged type Y zeolite (CREY), the preparation of which is disclosed in U.S. Pat. No. 3,402,996, ultrastable type Y zeolite (USY) as disclosed in U.S. Pat. No. 3,293,192, as well as various partially exchanged type Y zeolites as disclosed in U.S. Pat. Nos. 3,607,043 and 3,676,368. The catalysts may also contain molecular sieves such as SAPO and ALPO as disclosed in U.S. Pat. No. 4,764,269. Typical catalyst compositions will include from about 5 to 50 weight percent molecular sieve, about 1 to 50 weight percent Lewis acid alumina dispersed in the catalyst particles, and the balance will comprise an inorganic oxide matrix which comprises binders and additives such as silica, silica alumina and alumina gels and sols as well as clay such as kaolin. Procedures that may be used to prepare FCC catalysts of the invention are disclosed in U.S. Pat. Nos. 3,957,689, 4,126,579, 4,226,743, 4,458,023 and Canadian patent 967,136. The catalyst composition preferably contain 10 to 60 wt. % clay and 10 to 30 wt. % inorganic oxide binder selected from the group consisting of silica, alumina, silica alumina and mixtures thereof.

The desulfurizing Lewis acid additive/catalyst compositions of the present invention possess the following characteristics: A surface area of 30 to 400 $m^2/g$ as determined by BET; a bulk density of 0.4 to 0.9 g/cc; an attrition resistance of 1 to 20 DI (Davison Index) as described as follows: A 7 g sample of catalyst is screened to remove particles in the 0 to 20 micron size range. The particles above 20 microns are then subjected to a 5 hour test in the standard Roller Particle Size Analyzer using a 0.07 inch jet and 1 inch I.D. U-Tube as supplied by American Instrument Company, Silver Spring, Md. An air flow of 21 liters per minute is used. The Davison Index is calculated as follows:

$$\text{Davison Index} = \frac{\text{Wt. 0–20 micron material formed during test}}{\text{Wt. original 20 + micron fraction;}} \times 100$$

The hydrocarbon feedstocks that are used typically contain from about 0.1 to 2.5 weight percent, and as much as 4 weight percent sulfur. These feedstocks include gas-oils which have a boiling range of from about 340° to 565° C. as well as residual feedstocks and mixtures thereof.

The catalytic cracking process is conducted in conventional FCC units wherein reaction temperatures that range of from about 400° to 700° C. and regeneration temperatures from about 500° to 850° C. are utilized. The catalyst, i.e. inventory, is circulated through the unit in a continuous reaction/regeneration process during which the sulfur content of cracked gasoline and diesel fuel fraction is reduced by 5 to 100 percent.

Having described the basic aspects of the invention, the following examples are given to illustrate specific embodiments in which Table I shows the conditions of the microactivity testing of the examples of the invention, and Table II shows the feedstock properties of the feedstock used in the testing; and Table III shows the conditions of the circulating riser/regenerator pilot unit. All of the cracked products were analyzed for sulfur using capillary gas chromatography with an atomic emission detector, as described in Albro et al (accepted for publication in Journal of High Resolution Chromatography).

Example 1

An alumina substrate having a surface area of 350 $m^2/g$, a water pore volume of 1 cc/g (SRA alumina as supplied by Grace-Davison) was impregnated with Ni to a level 10% by weight Ni as follows: 48.3 g of $Ni(NO_3)_2 \cdot 6\ H_2O$ was dissolved into 100 ml $H_2O$. 100 g of dry SRA powder was impregnated with the above $Ni(NO_3)_2 \cdot 6\ H_2O$ solution. The impregnated powder was dried overnight at 110° C., then heat treated at 815° C. for 4 hours. The material was then screened to obtain a fraction having a particle size range of 20 to 100 microns. The sized material was then steamed for 4 hours at 815° C. with 100% $H_2O$ vapor to obtain a sample having a surface area of 106 $m^2/g$, and an X-ray diffraction pattern which identified the presence of $Ni(Al_2)_2$.

Example 2

A sample which comprised 10 weight percent Cu on alumina was prepared using the general procedure of Example 1, except that the $Ni(NO_3)_2 \cdot 6\ H_2O$ in the impregnating solution was replaced with 38.6 g of Cu $(NO_3)_2 \cdot 2.5$ $H_2O$. The surface area of the material was 70 $m^2/g$ and the X-ray diffraction pattern identified the presence of $Cu(AlO_2)_2$.

Example 3

Figure 2:
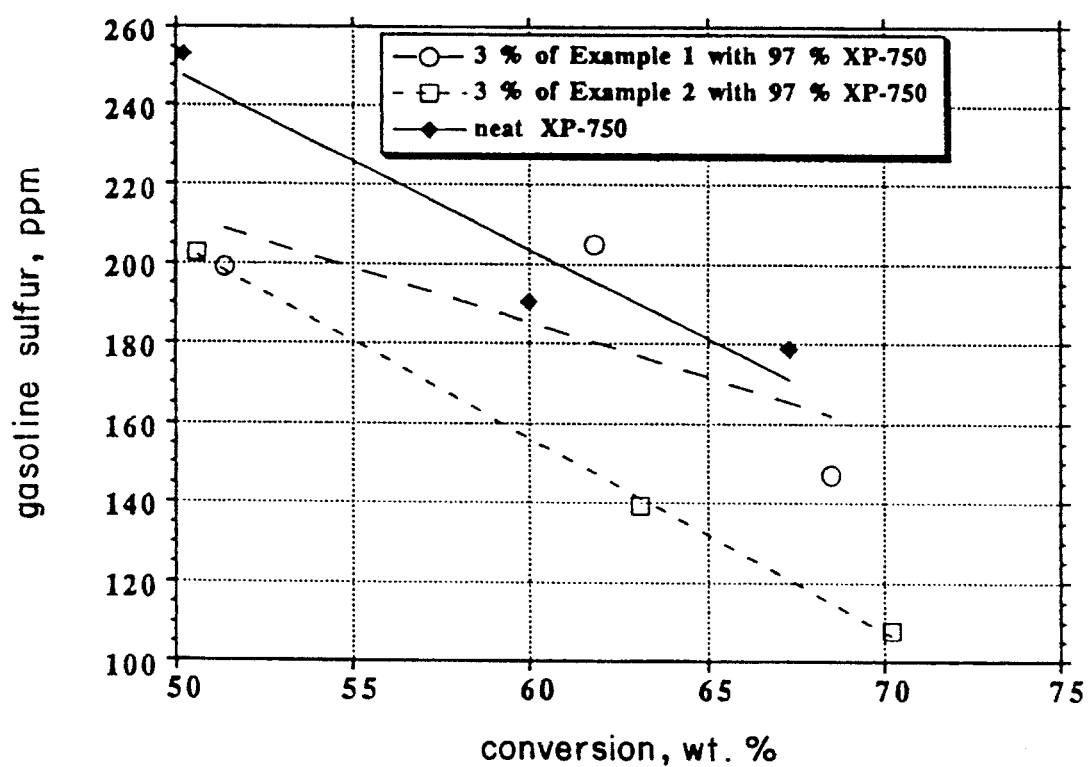

FCC catalyst samples were prepared by blending 3 weight percent of the samples of Examples 1 and 2 with XP-750, a commercial cracking catalyst obtained from Grace-Davison. The mixture was tested by MAT (ASTM procedure D-3907), as well as 100% XP-750 and the gasoline analyzed for sulfur. FIG. 1 shows the sulfur content of the full range gasoline, T90+380° F., endpoint=430° F. versus conversion FIG. 2 shows the sulfur content of cut gasoline, T90=300° F., endpoint=340° F. versus conversion. As shown in both figures, the sulfur content of the blends with the examples is significantly reduced.

Example 4

A sample which contained 10 weight percent Zn was prepared by the procedure of Example 1 except that the $Ni(NO_3)_2 \cdot 6 H_2O$ in the impregnating solution was replaced with 49.4 g of $Zn(NO_3)_2 \cdot 6 H_2O$. The surface area of the material was 142 $m^2/g$ and the X-ray pattern identified $Zn(AlO_2)_2$.

Figure 3:
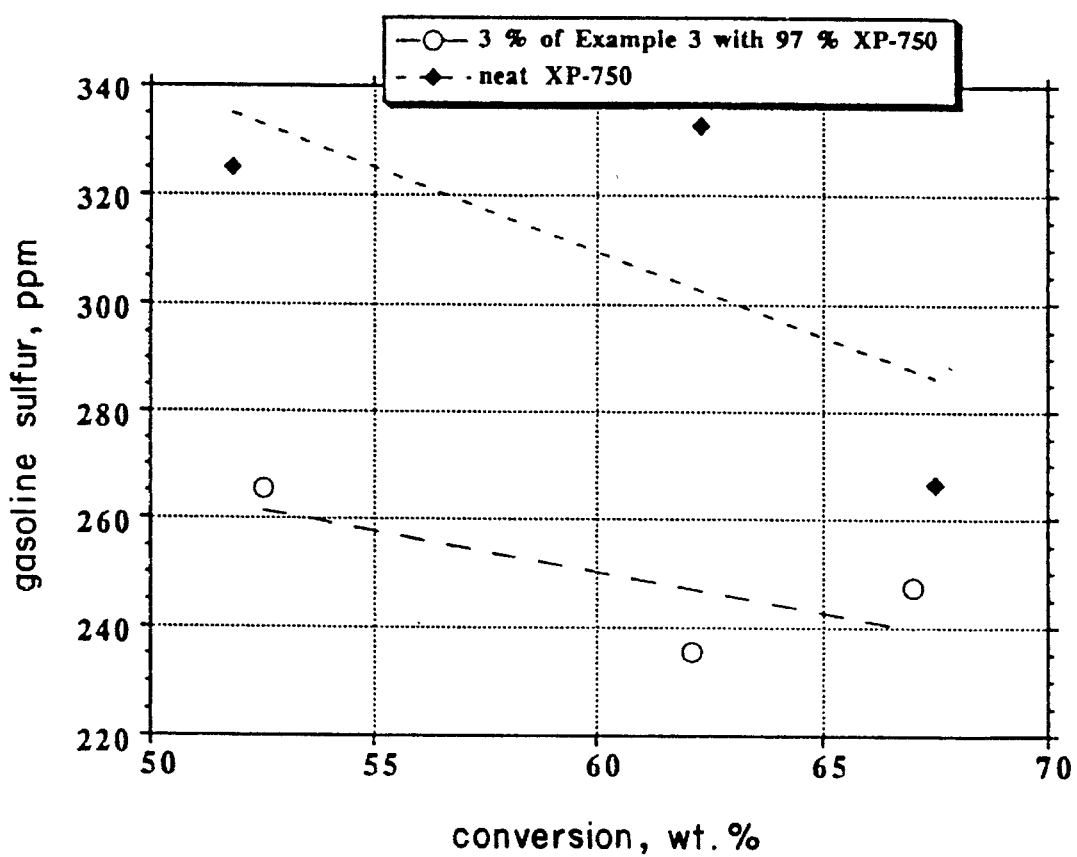
Figure 4:
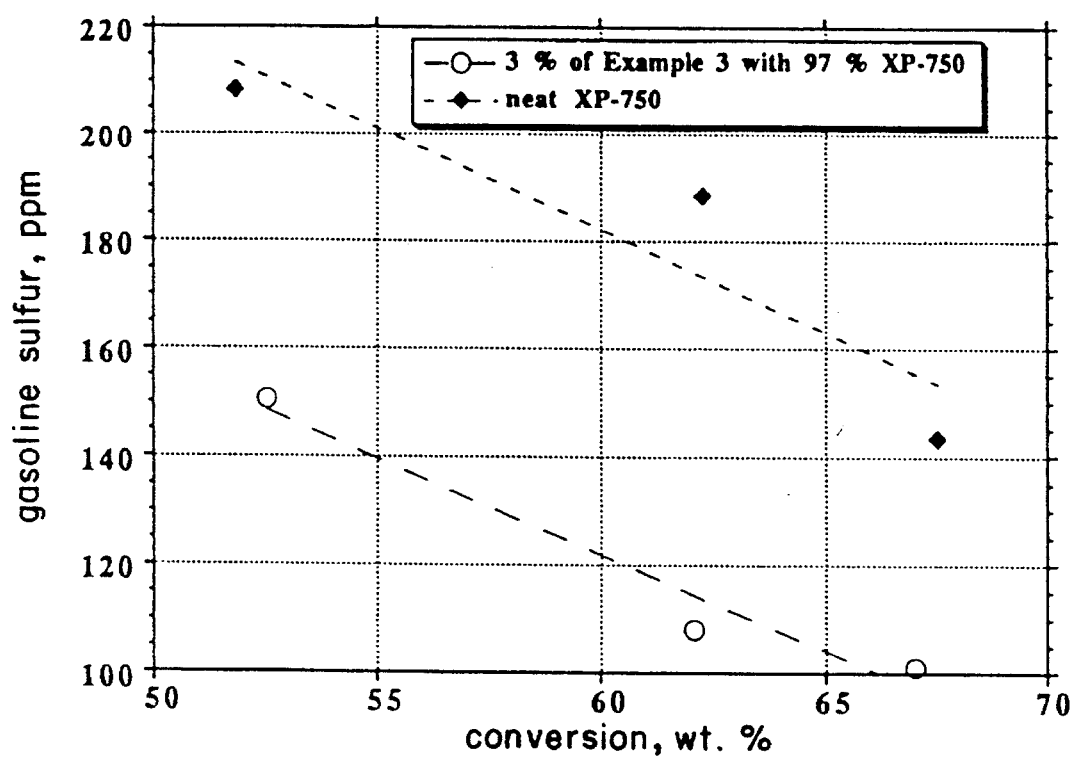

A blend of 3% by weight with steamed XP-750 was MAT tested as in Example 3. FIG. 3 shows the sulfur content of the full range gasoline, and FIG. 4 shows the cut gasoline, versus conversion. As seen in these figures, the use of Example 3 significantly reduces the sulfur content of the gasolines.

Example 5

Figure 5:
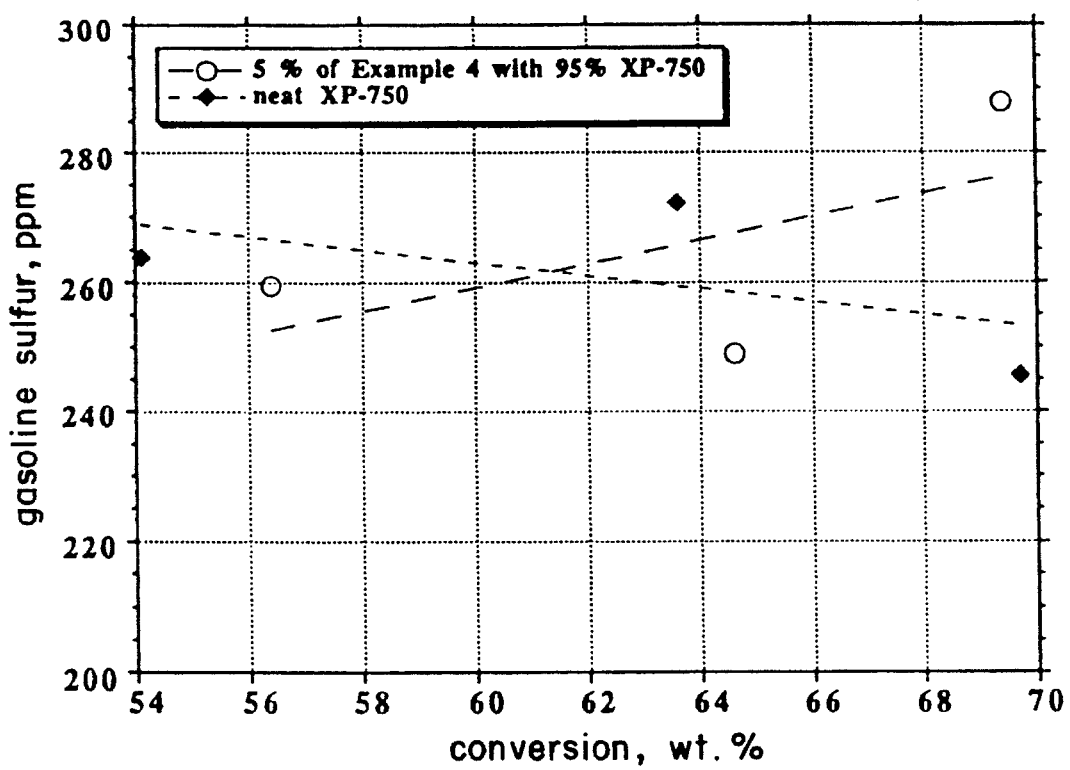
Figure 6:
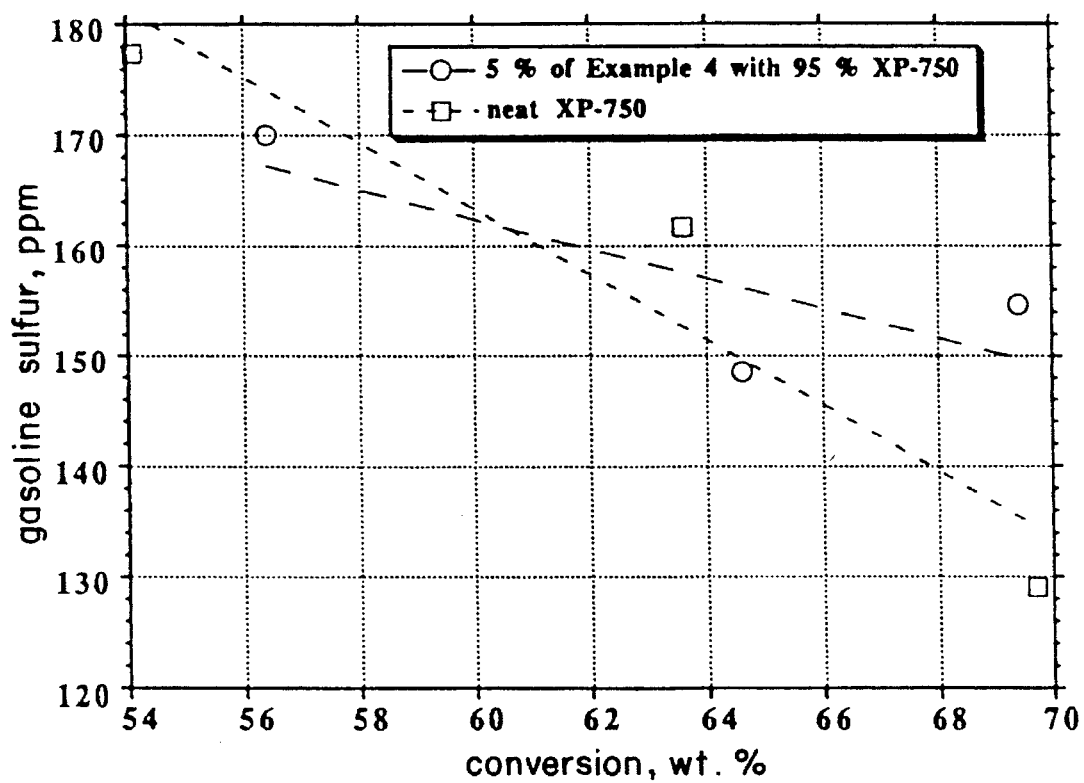

This example shows that the alumina support must be free of $SiO_2$. The incipient wetness of Grace-Davison SRS alumina, which contains 6% $SiO_2$ was determined to be 0.9 mls $H_2O/g$ SRS. 45.49 g of $Zn(NO_3)_2 \cdot 6 H_2O$ was dissolved into 237 mls $H_2O$. 263.04 g of SRS alumina (TV=31.57%) was impregnated with the above solution. The sample was dried overnight at 110° C., then calcined for 2 hours at 800° C. The surface area of the material was 176 $m^2/g$. A blend containing 5 weight percent of the calcined sample and 95 weight percent steamed (1500° F., 100% $H_2O$, 4 hours) XP-750 was prepared and tested by MAT, using 100% XP-750 as the base case. FIG. 5 shows the sulfur content of the full range gasoline, and FIG. 6 shows the sulfur content of the cut gasoline at T90=300° F., versus conversion. As shown when silica is present in the alumina support, the performance of the invention is degraded.

Example 6

Figure 7:
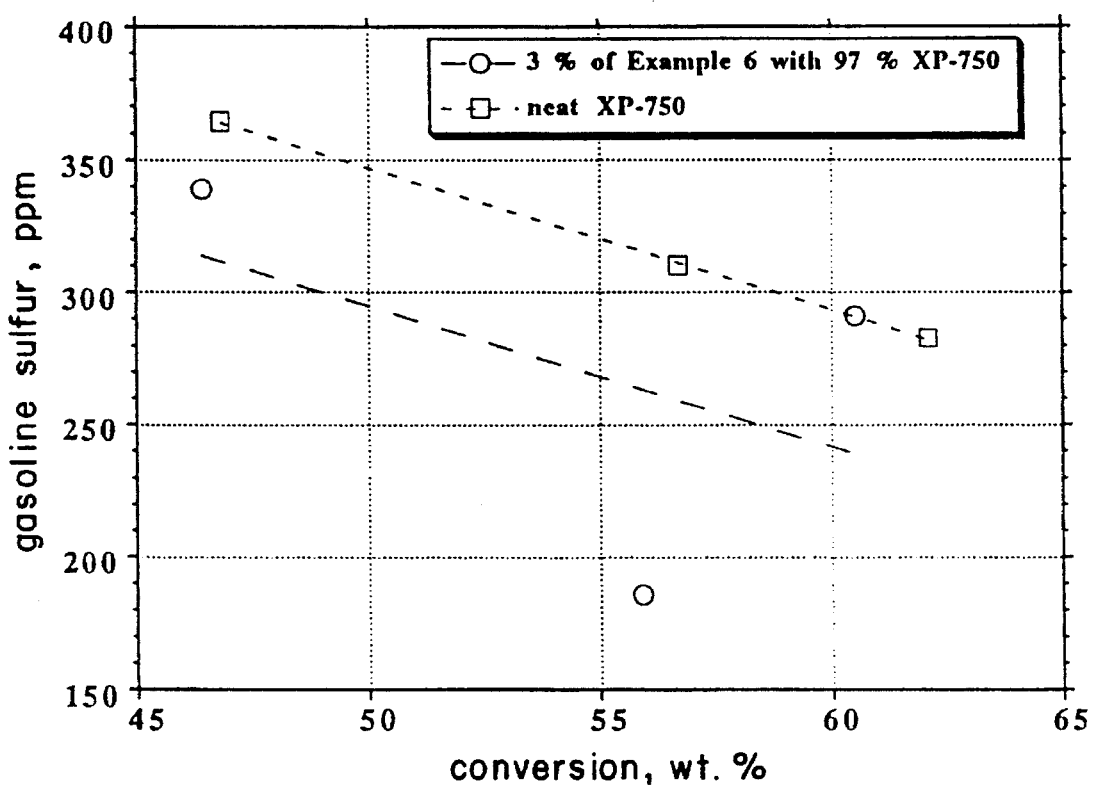
Figure 8:
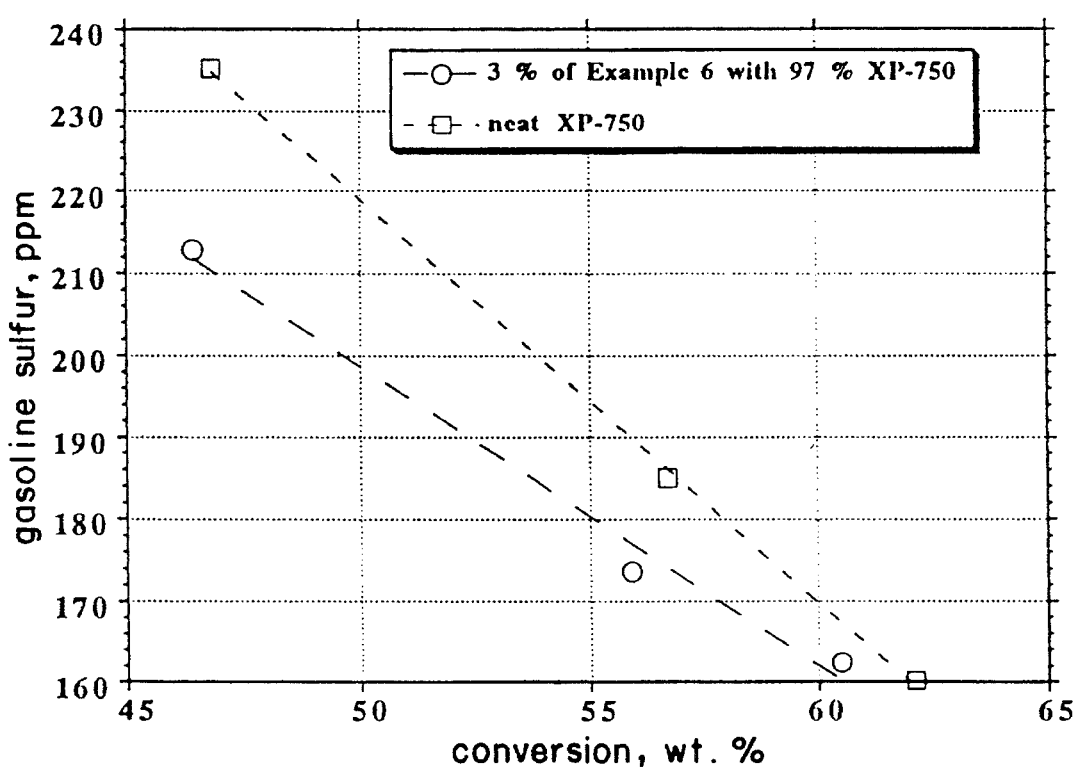

A catalyst composition consisting of zinc oxide/lanthana-neodymia/alumina was prepared by coprecipitation as follows: an acidic solution containing 68.88 g of ZnO and 34.44 g of $(La/Nd)_2O_3$ prepared from their nitrates along with 9.6 g of straight nitric acid, and was diluted with DI-water to 98.4 ml. A dilute sodium aluminate solution containing 68.88 g $Al_2O_3$ was also readied by diluting 340.99 g of plant-made solution with DI-water to 984 ml. These two solutions were fed into a beaker with 400 g of DI-water at 38°–43° C. at an equal rate of 40 ml/min., with good agitation, Feeding another feedstream of 16% sodium hydroxide solution directly into the beaker, pH of the resulting slurry of mixed hydrous oxide was maintained at 8.5–8.7 while maintaining the slurry at 38°–43° C. through the runoff. After 15 min. aging under this condition, pH of the slurry was raised to 9.0 with dilute sodium hydroxide, and the slurry was dewatered immediately using a Buchner funnel. The filtercake was then washed three times with 1.7 liters of 80° C. DI-water. The resulting filtercake was dried overnight in 115° C. oven, crushed, and sifted. Particles of 80–200 meshes were air calcined for 2 hours at 704° C. The resulting material was 74 $m^2/g$ BET ($N_2$) surface area, and had the following composition (weight %): 40.72% ZnO, 0.05% $Na_2O$, 16.24% $La_2O_3$, 1.89% $Nd_2O_3$, 18.18% total $RE_2O_3$, 0.15% $SO_4$, and 40.81% $Al_2O_3$. Powder X-ray diffraction scan largely exhibited a pattern characteristic of ZnO and the presence of $La_2O_3$. This example was then blended sith steamed XP-750 and MAT tested as in the previous examples. FIGS. 7 and 8 show the full range and cut gasoline sulfur levels for the blend with Example 6 and neat XP-750. As seen, a reduction in the sulfur content of the gasolines is achieved.

Example 7

This example shows the utility of this invention in circulating FCC riser/regenerator pilot unit testing. 15 kg of Davison SRA alumina was slurried in $H_2O$ to nominally 20% solids. The slurry was peptized with 35% HCl using 0.15 mols HCl/mole of $Al_2O_3$ in the slurry. The slurry was then sand milled, and peptized again with 0.1 moles HCl/mole of $Al_2O_3$. The slurry was then spray dried. 2 kg of the spray dried alumina was calcined for 2 hours at 538° C. to remove moisture and HCl. 100 g of the above material was impregnated with 45.49 g of Zn $(NO_3)_2 \cdot 6 H_2O$ dissolved in 100 g $H_2O$. This impregnation was repeated 13 times, then combined, making Example 7. The combined materials were calcined for 3 hrs at 704° C. to pre-treat the materials for testing.

Figure 9:
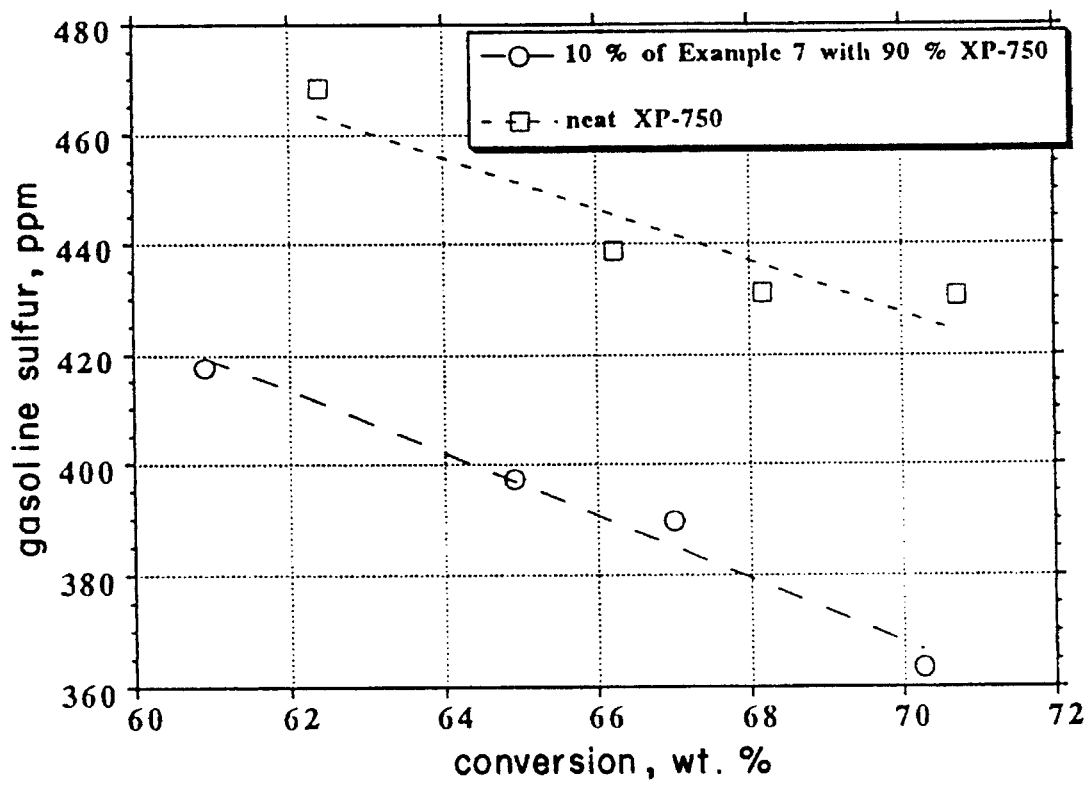
Figure 10:
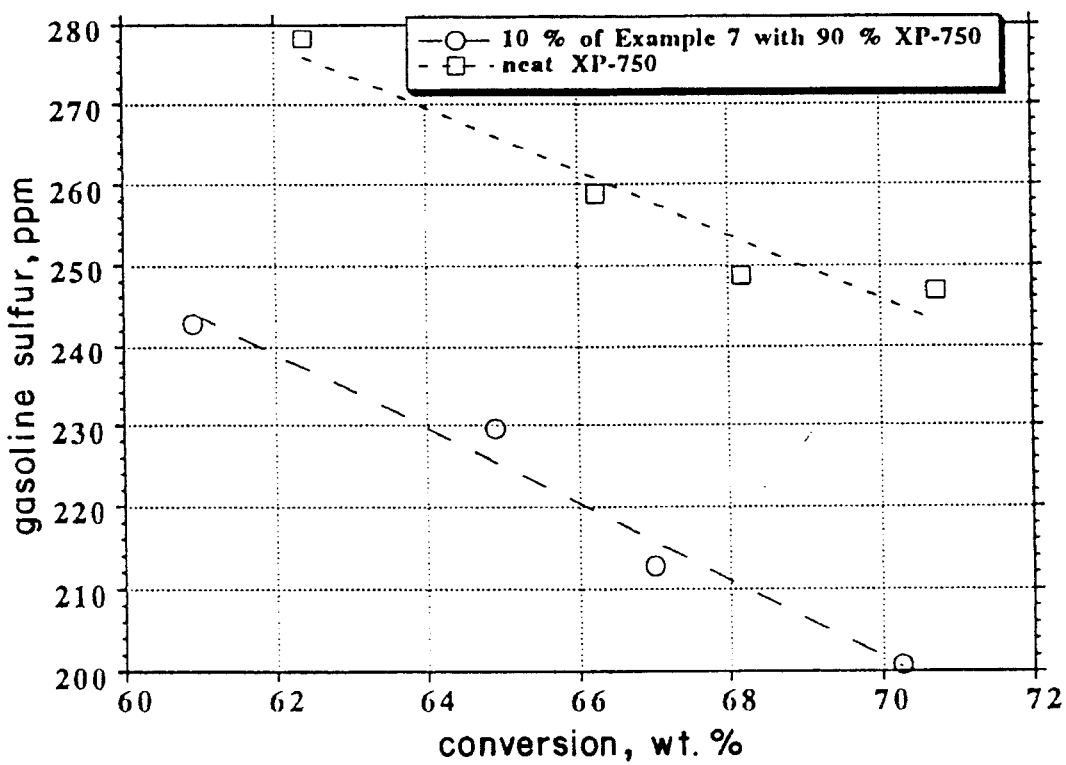
Figure 11:
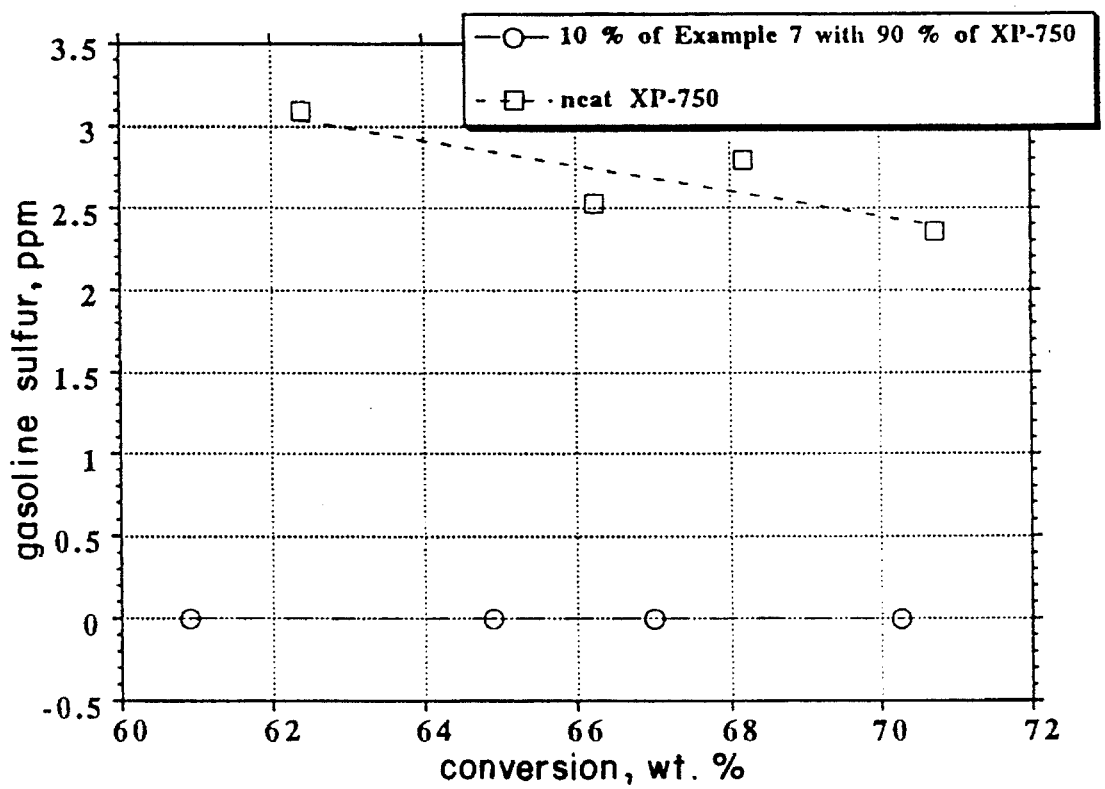
Figure 12:
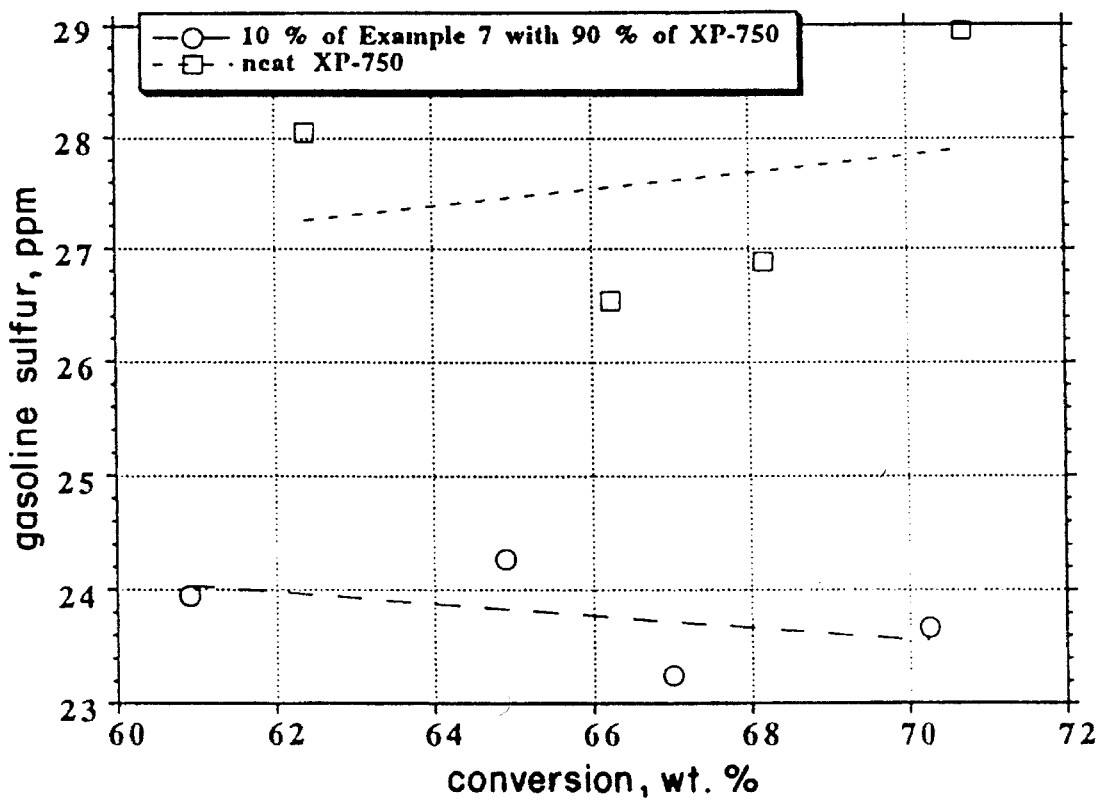
Figure 13:
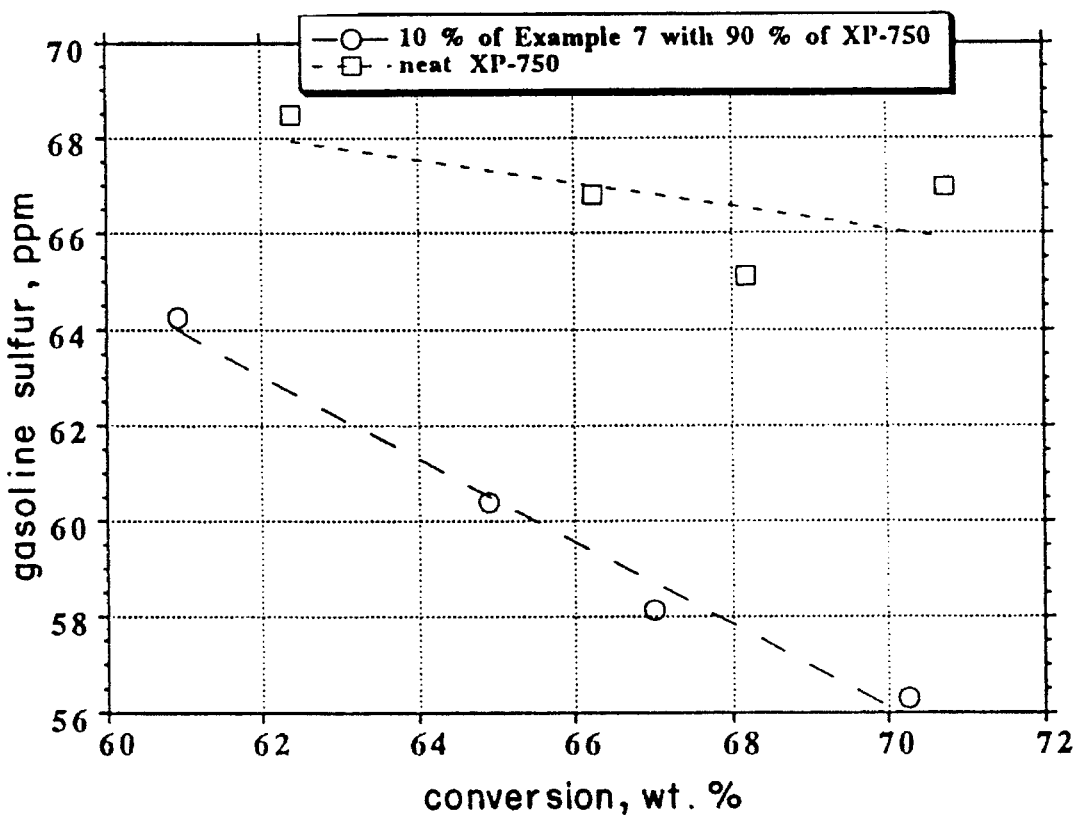
Figure 14:
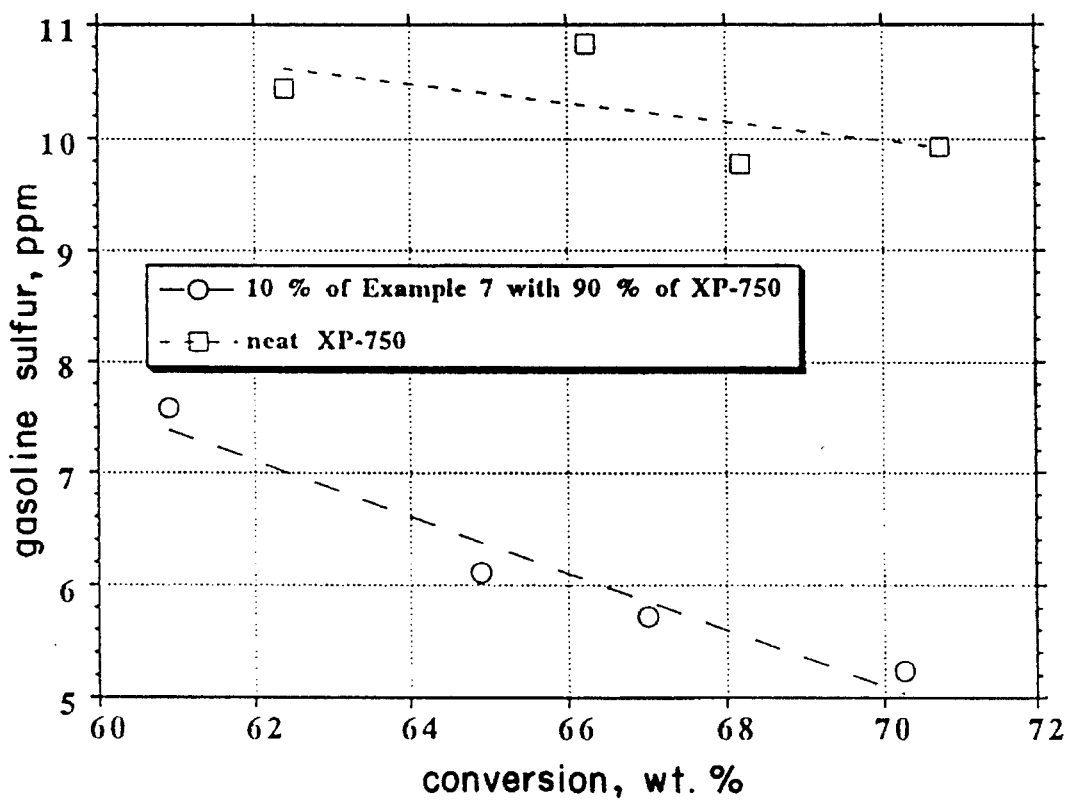
Figure 15:
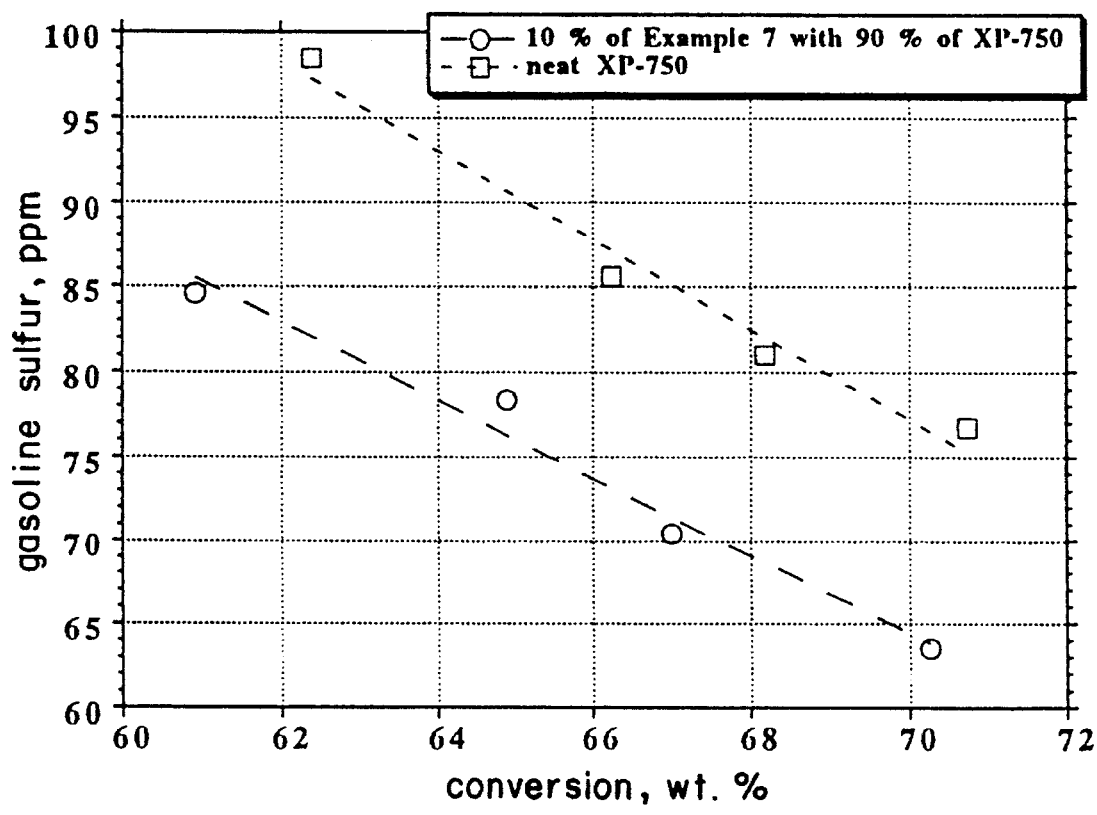
Figure 16:
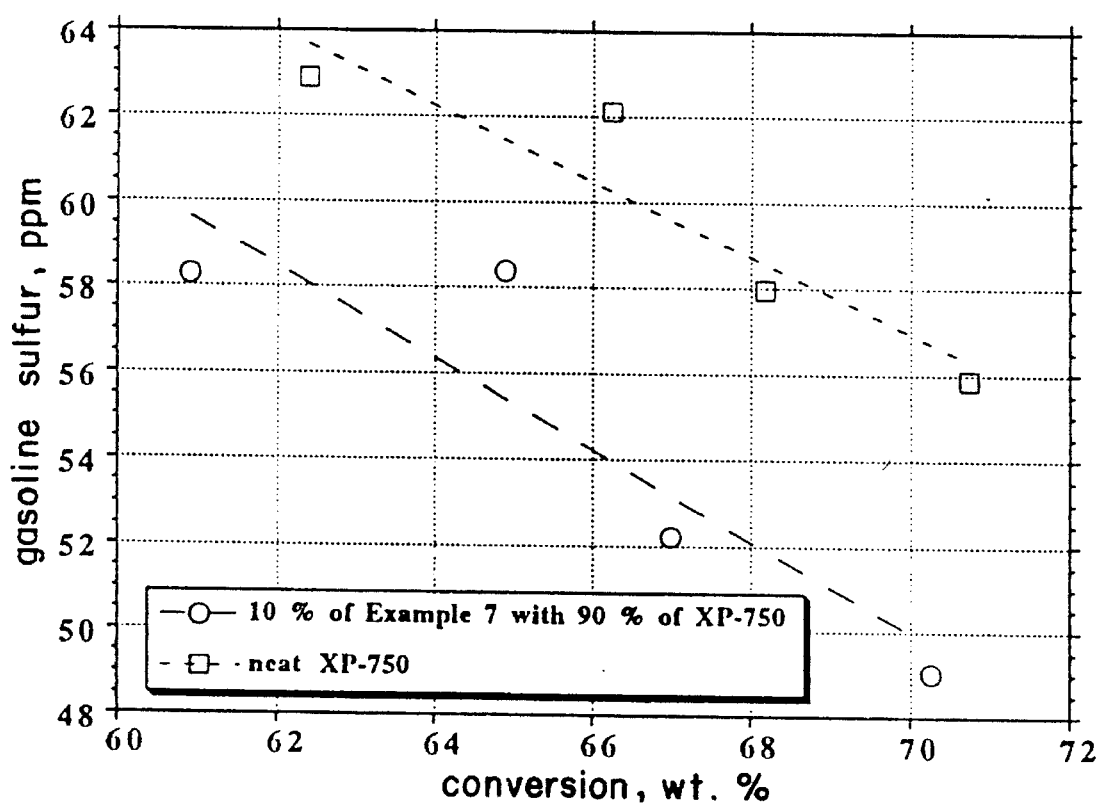
Figure 17:
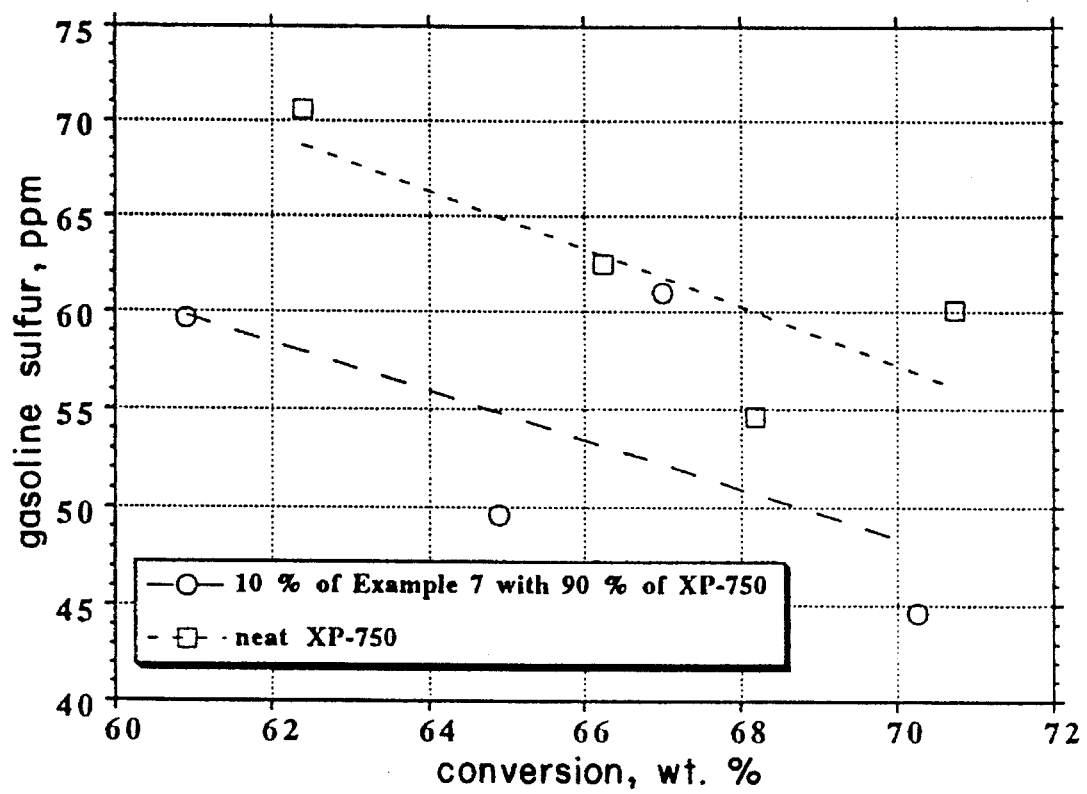
Figure 18:
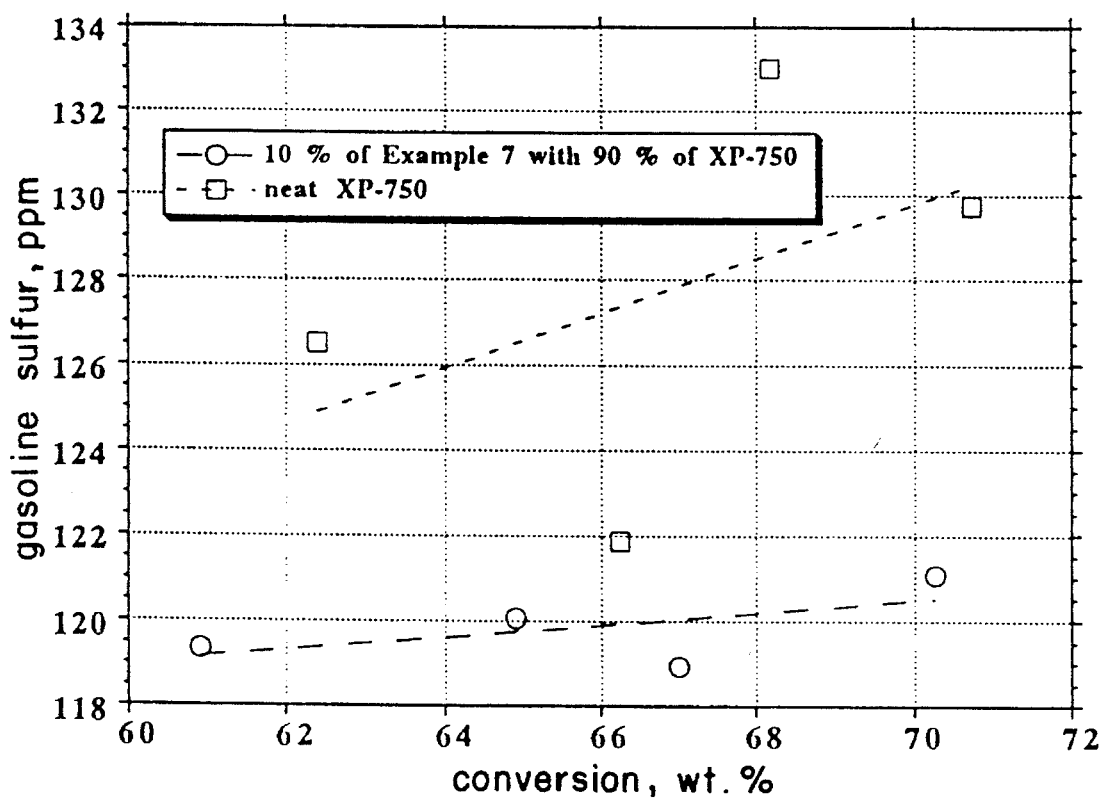

A charge of 2300 g of XP-750 was loaded into the Davison Circulating Riser (DCR) and a yield curve at various conversions was run. 255.5 g of pretreated Example 7 was then added to the inventory of the DCR to give a nominal blend of 10% of Example 7 with 90% of XP-750. Another yield curve was run by varying the conversion. The gasolines from the riser testing were analyzed fur sulfur in a similar fashion to the previous MAT studies. FIGS. 9 and 10 show the full range and cut gasolines for neat XP-750 and the 10% blend with Example 7. Again, a clear reduction in the sulfur content of the gasolines is observed with this invention in riser/regenerator pilot unit testing. To further illustrate the effectiveness of this invention FIGS. 11–18 show the concentrations of the individual classes of sulfur species in the gasoline fraction from the pilot unit testing. These classes are, respectively, the $C_3$ to $C_6$ mercaptans, thiophene, methylthiophenes, tetrahydrothiophene, $C_2$ alkyl thiophenes, $C_3$ alkyl thiophenes, $C_4$ alkyl thiophenes, and benzothiophene. In all cases, a reduction of the concentrations of the compounds is observed. Furthermore, an increase in gasoline yield, which would account for the reduction in concentration in a simple way was not observed.

TABLE I

| Conditions for Microactivity Testing (MAT) | | | |
|---|---|---|---|
| Temperature, °F. | | 980 | |
| nominal catalyst charge, gr. | | 5 | |
| cat to oil weight ratios | 2 | 3 | 4 |
| WHSV, $hr^{-1}$ | 60 | 40 | 30 |

TABLE II

| Feed Properties | |
|---|---|
| °API | 27.8 |
| Anline Point, °F. | 187 |
| Sulfur, wt. % | 0.474 |
| Total Nitrogen, wt. % | 0.07 |
| Basic Nitrogen, wt. % | 0.02 |
| Conradson Carbon, wt. % | 0.16 |
| Ni, ppm | 0.14 |
| V, ppm | 0.1 |
| FE, ppm | 0.4 |
| Cu, ppm | <0.1 |
| Simulated Distillation, vol. % °F. | |
| IBP | 338 |
| 5 | 444 |
| 10 | 486 |
| 20 | 549 |
| 30 | 603 |
| 40 | 640 |
| 50 | 694 |
| 60 | 734 |
| 70 | 786 |
| 80 | 840 |
| 90 | 910 |
| 95 | 961 |
| FBP | 1065 |
| K factor | 11.68 |

TABLE III

| Testing Conditions of the Davison Circulating Riser (DCR) FCC Pilot Plant | |
|---|---|
| Adiabatic Operating Mode | |
| Riser Outlet Temperature | 970° F. |
| Feed Preheat Temperature | 250–750° F. |
| Regenerator Temperature | 1300° F. |
| Reactor Pressure | 25 psig |
| Catalyst Deactivation of the XP-750: | |
| 4 hrs./1500° F./100% Fluid Bed Steaming | 0 psig Steam |

What is claimed is:

1. A method for the catalytic cracking of sulfur-containing hydrocarbons which comprises (A) reacting a hydrocarbon feedstock in the presence of a catalyst comprising (a) a molecular sieve dispersed in an inorganic oxide matrix, and (b) a Lewis acid-containing component comprising Lewis acid supported on alumina wherein (1) said component comprises about 1 to 50 wt. % Lewis acid based on the total weight of Lewis acid and alumina in said component, and (2) said Lewis acid contains (i) an element selected from the group consisting of Ni, Cu, Zn, Ag, Cd, In, Sn, Hg, Tl, Pb, Bi, B, Ga and Al, or (ii) a compound, other than alumina, wherein said compound contains at least one of said elements, and (B) recovering gasoline fractions having a reduced sulfur content.

2. The method of claim 1 wherein said feedstock contains in excess of up to about 4 weight percent S.

3. The method of claim 1 wherein said Lewis acid-containing component is present as a separate particulate additive.

4. The method of claim 1 wherein said Lewis acid-containing component is present in the same inorganic oxide matrix as said molecular sieve.

5. The method of claim 1 wherein said molecular sieve includes a zeolite.

6. The method of claim 1 wherein said catalyst comprises about 1 to 50 wt. % of said Lewis acid-containing component.

7. The method of claim 6 wherein said molecular sieve is a synthetic faujasite and said catalyst comprises about 5 to 50 wt. % synthetic faujasite, 10 to 60 wt. % clay and 10 to 30 wt. % inorganic oxide binder selected from the group consisting of silica, alumina, silica alumina and mixtures thereof.

8. The method of claim 1 wherein said alumina of said Lewis acid-containing component has a surface area of about 30 to 400 m$^2$/g.

9. The method of claim 1 wherein said Lewis acid contains zinc or a zinc compound.

10. The method of claim 9 wherein said Lewis acid is ZnO.

11. The method of claim 3 wherein said particulate additive has a particle size of about 20 to 140 μm, a DI of 1 to 20, and a bulk density of about 0.4 to 0.9 g/cc.

* * * * *